United States Patent [19]

Aoki et al.

[11] Patent Number: 4,936,203
[45] Date of Patent: Jun. 26, 1990

[54] APPARATUS FOR SHAPING AND ARRAYING SPHEROIDAL BODIES OF FOOD MATERIALS

[75] Inventors: Shigeru Aoki; Torahiko Hayashi; Yuji Suzuki, all of Tochigi, Japan

[73] Assignee: Rheon Automatic Machinery Co., Ltd., Utsunomiya, Japan

[21] Appl. No.: 392,222

[22] Filed: Aug. 9, 1989

[30] Foreign Application Priority Data

Sep. 3, 1988 [JP] Japan ................... 63-11649
Jan. 26, 1989 [JP] Japan ................... 1-17031
Jan. 26, 1989 [JP] Japan ................... 1-7846[U]
Jan. 26, 1989 [JP] Japan ................... 1-7847[U]

[51] Int. Cl.$^5$ ............... A21C 11/10; B65G 21/22; B65G 23/44
[52] U.S. Cl. ............... 99/450.1; 198/629; 198/813; 425/132; 425/142; 425/308
[58] Field of Search ............... 99/450.1, 450.6, 450.7, 99/537, 443 C; 425/132, 133.1, 142, 308, 406, 164, 287, 466; 222/55, 63, 145; 426/503, 516; 198/812, 855, 857, 859, 813, 858, 631, 861.1, 629, 804; 53/249, 122, 514; 141/283, 129

[56] References Cited

U.S. PATENT DOCUMENTS

| | | | |
|---|---|---|---|
| 1,274,606 | 8/1918 | Salerno | 99/450.1 X |
| 3,196,810 | 7/1965 | Roth | 53/122 X |
| 3,444,982 | 5/1969 | Greiner | 198/600 X |
| 3,822,007 | 7/1974 | Bridge, Jr. | 198/631 |
| 4,024,945 | 5/1977 | Mugishima | 198/631 X |
| 4,492,553 | 1/1985 | Giulio et al. | 425/308 |
| 4,734,024 | 3/1988 | Tashiro | 425/142 X |
| 4,767,305 | 8/1988 | Tashiro | 425/308 |
| 4,844,296 | 7/1989 | Hayashi et al. | 222/1 |
| 4,882,185 | 11/1989 | Simelunas et al. | 425/133.1 X |

Primary Examiner—Harvey C. Hornsby
Assistant Examiner—Scott J. Haugland
Attorney, Agent, or Firm—Guy W. Shoup; Paul J. Winters

[57] ABSTRACT

An apparatus for shaping and arraying spheroidal bodies is provided. The apparatus comprises a means for continuously supplying a cylindrical body comprising an outer material and a filler material, a cutter assembly having cutter members circumferentially disposed to form a central opening, and an arraying device having an endless belt for transferring a tray. The cutter members slide inwardly to close the opening, and thus the part of the cylindrical body inserted in the opening is shaped into a spheroidal body. An endless belt device is disposed beneath the cutter assembly and the belt is driven intermittently and forwardly and the frame of the endless belt device is moved back and forth in a transverse direction. By moving the belt and frame of the endless belt device so that predetermined positions of its belt are in turn moved to a position directly beneath the opening of the cutter assembly, the spheroidal bodies drop on each predetermined position on a tray placed on the belt. Therefore, the spheroidal bodies are automatically arrayed on the tray.

10 Claims, 8 Drawing Sheets

APPARATUS FOR SHAPING AND ARRAYING SPHEROIDAL BODIES OF FOOD MATERIALS

BACKGROUND OF THE INVENTION

1. Field of the Invention

This invention relates to an apparatus for shaping and arraying spheroidal bodies of food materials that are formed by enveloping a filler material with a crust material. In particular, it relates to an apparatus for shaping such spheroidal bodies without exposing their filler material, and automatically arraying the shaped bodies on a tray.

2. Prior Art

The assignee's earlier application, U.S. Pat. No. 4,737,024, discloses an apparatus for shaping a spheroidal body consisting of dough crust and a filling. In this invention a cylindrical body consisting of dough crust and a filling is continuously fed to a central opening formed by circumferentially disposed cutter members. The members slide on each other so as to constrict the body until its lowermost end is shaped into a spheroidal body and is severed from the remaining part of the body. However, this apparatus does not include a means for arraying the shaped spheroidal body in a tray or package. Therefore, an operator manually receives the spheroidal bodies from a receiving means of the apparatus, for example, a conveyor, and arrays them on a tray or package. To automate such an arraying step, another apparatus is required. U.S. Pat. No. 4,024,945 discloses an apparatus for transferring formed articles and arraying them in trays and boxes. U.S. Pat. No. 3,444,982 also discloses an apparatus for handling and positioning articles in containers. Usually, the shaping apparatus of the prior art is combined with these arraying apparatuses so that the finished products that are transferred by the conveyor of the shaping apparatus are received and arrayed by the arraying apparatus. In the food production industry, it is preferable for sanitary purposes to automate the full production process to prevent products from being touched by the hand or any other part of an operator. Further, buying two separate apparatuses and placing them in a plant costs a significant amount of money and results in more space being used.

SUMMARY OF THE INVENTION

One object of this invention is to provide an apparatus in which spheroidal bodies of food materials are automatically shaped and arrayed on a tray so that the possibility of an operator's hand or any other part touching the spheroidal bodies can be completely eliminated.

Another object of this invention is to provide an apparatus which can shape spheroidal bodies and array them on a tray of any desired shape or dimension.

According to this invention, an apparatus for shaping and arraying spheroidal bodies of food materials is provided, comprising a device for shaping spheroidal bodies, having supply means for continuously supplying a cylindrical body composed of an outer layer of a plastic material and a central filling longitudinally in a downstream direction, a cutter assembly disposed downstream of said supply means having at least three circumferentially disposed cutter members arranged in sliding contact with each other so as to form a central opening which is openable for shaping the received part of the cylindrical body into a shaped spheroidal body and severing it from the remainder of said cylindrical body, and means for slidably moving said cutter members inwardly and outwardly of said central opening relative to each other in a direction transverse to the downstream direction of said cylindrical body so as to open and close said central opening of said cutter assembly to form each such shaped spheroidal body, an endless belt device disposed beneath said shaping device for transferring trays for said spheroidal bodies, and a first means for driving the belt of said endless belt device forwardly and intermittently, and a second means for moving said endless belt intermittently in a transverse direction, and said first and second means being operated synchronously with the operation of said member moving means. In this invention, the spheroidal bodies are shaped by the shaping bodies. Then the spheroidal bodies drop onto a tray on the endless belt device, which bodies are positioned so that a preselected position of the tray is directly beneath the opening of the shaping device.

EMBODIMENT

Figure 1:
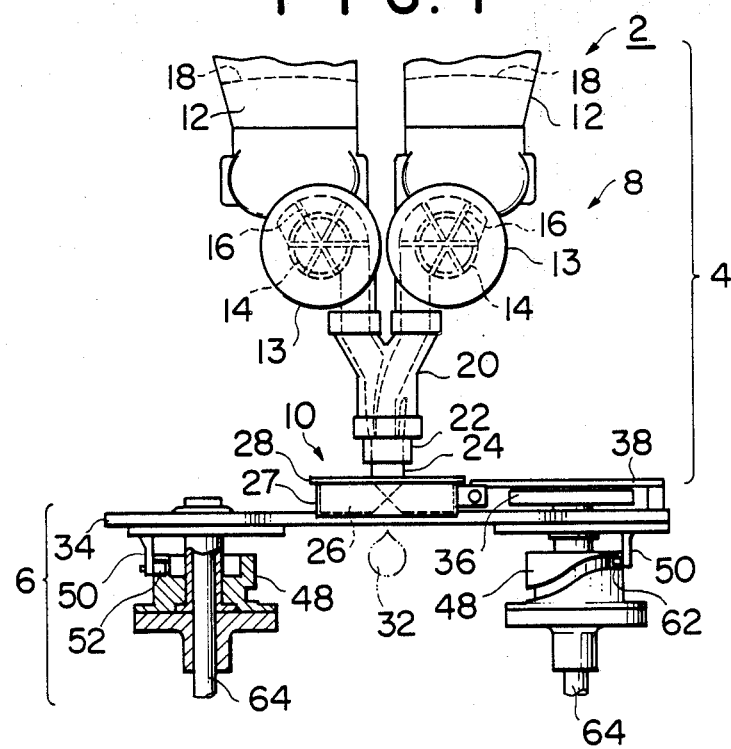
FIG. 1 shows the front view of a means for supplying a cylindrical body and a cutter assembly of a shaping device included in an apparatus for shaping and arraying spheroidal bodies of a preferable embodiment of this invention.
Figure 2:
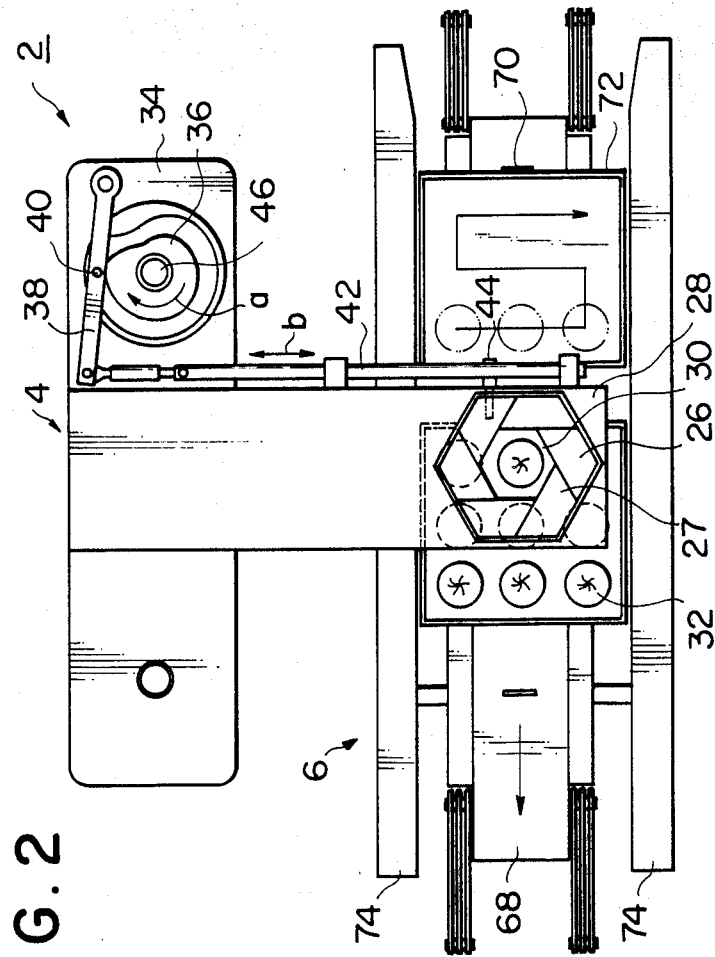
FIG. 2 shows the top view of the shaping device and the endless belt device of the arraying device included in the apparatus of FIG. 1.
Figure 3:
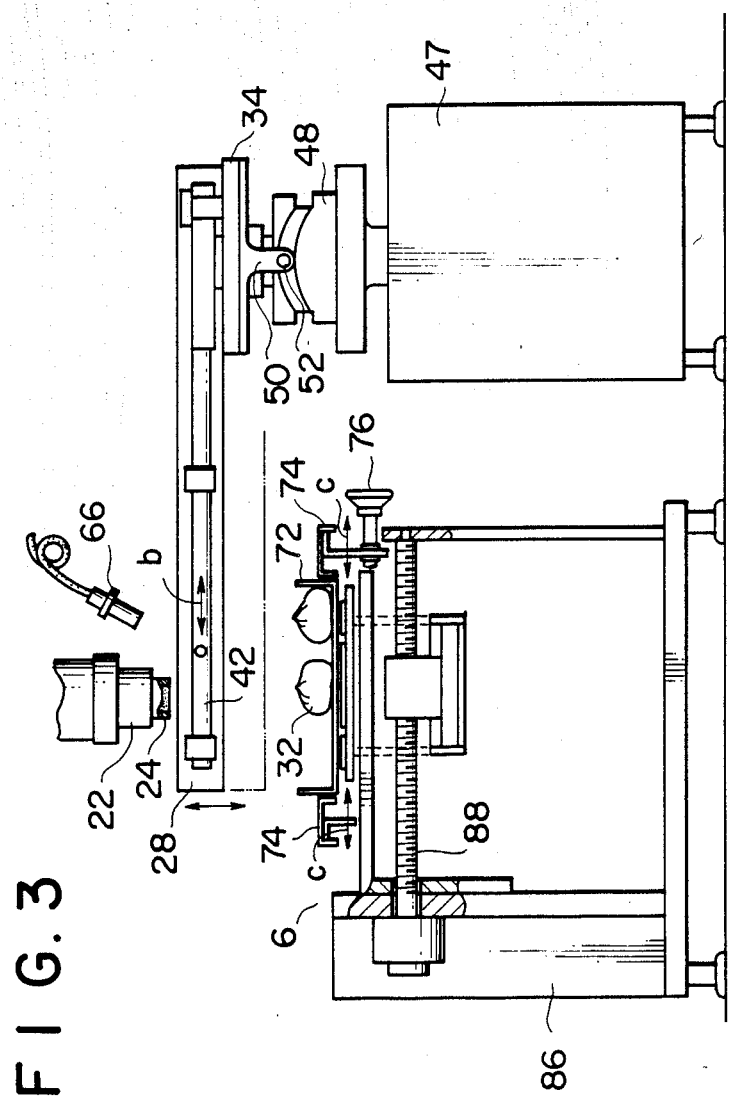
FIG. 3 shows the side view of the shaping device and the arraying device of the apparatus of FIG. 1.

In FIGS. 1, 2, and 3, an apparatus (2) for shaping and arraying spheroidal bodies of food materials of a preferred embodiment of this invention comprises a shaping device (4) and an arraying device (6). The shaping device (4) includes a means (g) for continuously supplying a cylindrical body consisting of an outer food material and a filler material and a cutter assembly (10) supported beneath the discharge port of the supply means (8).

The supply means (8) may be an apparatus for quantatively delivering food materials disclosed in the earlier application of the assignee of this invention, U.S. Ser. No. 165,717, and this earlier application is hereby incorporated in this application by reference. The supply means (8) includes screws (not shown) disposed at the bottoms of hoppers (12), and a delivering section (13) for each hopper in which a rotating cylinder, (14) and vanes (16) that are freely slidable in respective pairs of slots formed in the periphery of the cylinder, are provided. The outer layer material and the filler material

(18) of a cylindrical body (24) are fed by the screws, and introduced into the compartments formed between the vanes (16), for measuring. The discharge ports of the delivering sections are connected to the inlet ports of a bifurcated composite pipe (20). The composite pipe (20) has a concentric discharge port (22) whose outer pipe communicates with the outlet of the delivering section that delivers the outer layer material and whose inner pipe communicates with the outlet of the delivering section that delivers the filler material. Therefore a cylindrical body (24), consisting of the outer food material and the central filling material that longitudinally extends in the body, is continuously supplied from the concentric discharge port.

Figure 1A:
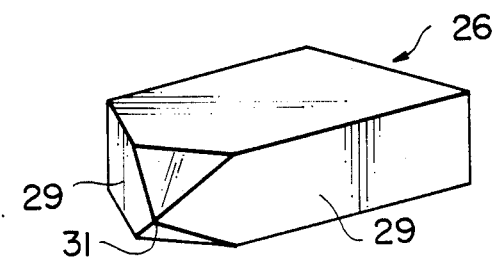
FIG. 1A shows the perspective view of a cutter member of the cutter assembly in the apparatus of FIG. 1.

The cutter assembly (10) may be the cutter assembly disclosed in U.S. Pat. No. 4,734,024. This patent has been assigned to the assignee of this invention, and is hereby incorporated in this application by reference. This assembly (10) includes six hexahedral cutter members (26) as shown in FIG. 1A. They are arranged in sliding contact with each other in the opening of a frame (27) provided in a holder plate (28) so as to form a central opening (30) as shown in FIG. 2. When the lowermost end part of the cylindrical body (24) is inserted into the opening (30), the members slide to close the opening and thus to constrict the body. As a result, the spheroidal body is cut from the remaining part of the cylindrical body. In this embodiment, as shown in FIG. 1A, two sliding surfaces (29) of each cutter member have a significant width, but at an end it tapers off to form an edge (31). Therefore, as the cutter members (26) are moved inwardly to close the central opening (30), each cutter member's area of contact with the outer layer of the cylindrical body (24) gradually decreases so as to smoothly close the outer layer over the inner filling of the resulting spheroidal body (32).

The holder plate (28), on which the cutter members are housed in the frame (27), is mounted on a base (34). On the base (34) a cam (36) and arm (38) are also mounted. The arm (38) has a cam follower (40) which moves along the periphery of the cam (36). The arm (38) is connected to a rod (42), which extends along one side of the holder plate (28). The rod (42) has a pin (44), which is connected to one of the cutter members (26) as shown in FIG. 2. The axis (46) of the cam (36) is connected to a motor (not shown). Since the rod (42) is slidably mounted on the side of the holder plate (28), as the cam rotates in the direction shown by the arrow a in FIG. 2, the cam (36) controllably moves the rod (42) via the arm (38) in the direction shown by the arrow b in FIG. 3. Therefore, as the member connected to the pin (44) moves inwardly and outwardly, the other cutter members also move to open and close the opening (30) when the rod (42) advances and retreats.

The base (34) is mounted on a pair of cam mechanisms (48) for raising and lowering the base (34). The cam mechanisms (48) are mounted on a table (47) as shown in FIG. 3. As shown in FIG. 1, for each cam mechanism (48) a vertical arm (50) extends from the base (34) and has a cam follower (52) attached to an end of the arm (50), which cam follower is inserted in a groove provided on the periphery of the cam mechanism (48). The axis (64) of each cam mechanism (48) is connected to a motor (not shown) so that the cam rotates synchronously with the rotation of the axis (46) of the cam (36). Therefore, as the cam mechanisms (48) rotate, the cam followers (52) move in the respective grooves of the cam mechanisms (48). As a result, the base (34) connected to the vertical arms (50) is raised and lowered synchronously with the movemment of the cutter members (26), which is caused by the rod (42). Accordingly, the cutter members (26) provided on the holder plate (28) mounted on the base (34) are lowered and raised synchronously with the closing and opening of the opening (30) of the cutter members (26), respectively.

In this embodiment a first spray means for spraying alcohol mist (64) is provided adjacent the cutter members. As shown in FIG. 3, its spray port is directed to the cutter members (26). When the members (26) begin to move outwardly to open the opening (30) after a spheroidal body is shaped, alcohol is sprayed on the surface of the cutter members (26) to prevent the members from adhering to the outer material of the cylindrical body when they contact it during the next shaping operation.

The arraying device (6) includes an endless belt device (68). On the belt of the endless belt device (68), hooks (70) are provided spaced apart from each other at predetermined spaces. These hooks (70) indicate the positions at which trays (72) for the spheroidal bodies (32) are to be placed. Therefore, an operator places a tray (72) on the belt so that the center of the trailing end of each tray contacts a hook (70), as shown in FIG. 2. Guide means (74) are provided along both longitudinal sides of the endless belt device (68). The guide means (74) includes a pair of holder arms extending along the sides of the endless belt device, and spaced apart from each other at a distance corresponding to the width of the tray (72). This distance can be readily adjusted by a handle (76, in FIG. 3) so that the arms can hold a tray of any dimensions between them. Therefore, the tray is placed in position on the belt of the endless belt device in front of the hook (70), and between the holder arms of the guide means (74).

Figure 4:
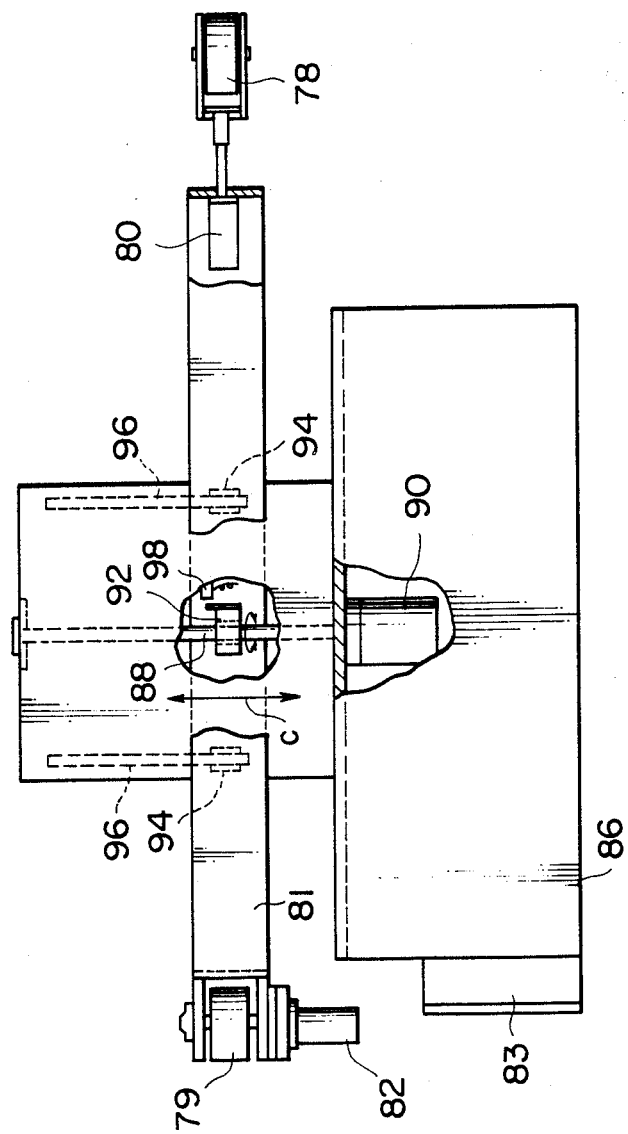
FIG. 4 shows the top view of the arraying device of FIG. 3 in which the belt of the endless belt device is removed.

In this embodiment, the distance between an adjacent pair of hooks can also be adjusted to the length of the tray (72). In this endless belt device, as shown in FIG. 4, an upstream end roller (78) is connected to the rod of an air cylinder mechanism (80) and a downstream end roller (79) is connected to a first servomotor (82). When a longer distance between the hooks (70) is needed so that the length of a big tray can be accommodated, as long as the number of the hooks is maintained the same, a longer belt is required. That is, the belt in use is to be replaced with a longer belt on which hooks (70) are provided at longer intervals. In this case, the air cylinder mechanism (80) is activated to advance its rod so that the upstream and downstream end rollers provide a proper tension to the belt they hold. Thus, by controlling the air pressure of the air cylinder mechanism (80), the tension of the belt of the endless belt device (68) can be readily adjusted.

The first servomotor (82) is operatively connected to a control unit (83), which can be any commercially available conventional sequencer. As will be discussed below, the control unit (83) controls the operation of the first servomotor (82) that intermittently drives the downstream end roller (79).

Figure 5:
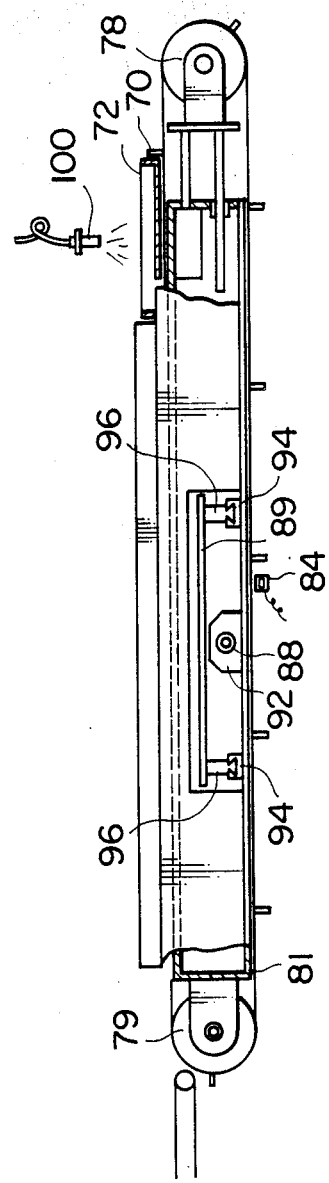
FIG. 5 shows the side view of the arraying device of FIG. 3.

As shown in FIG. 5, a first proximity switch (84) is provided adjacent the lower flight of the endless belt device (68). The first proximity switch (84) detects the passing of each hook by the switch as the belt of the endless belt device forwardly moves, and sends a signal to the control unit (83) to detect the position of each tray on the upper flight of the belt of the endless belt device, as will be discussed below.

Figure 6:
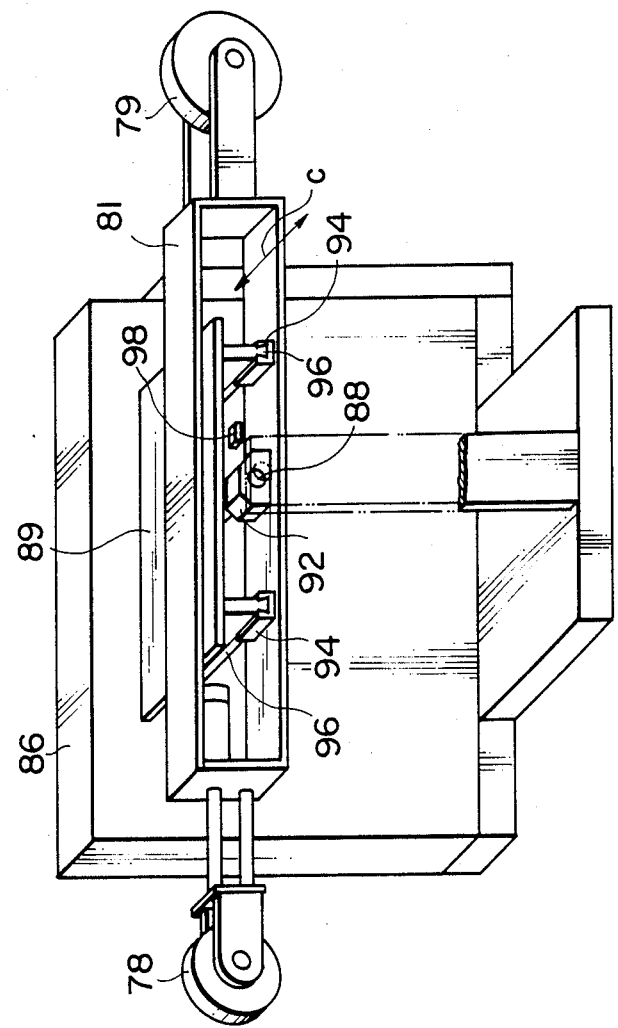
FIG. 6 shows a perspective view of the arraying device of FIG. 3.

The arraying device (6) includes a stand (86). As shown in FIGS. 3,4, and 6, one end of the thread bar (88) extends horizontally through a side wall of the stand (86), wherein it is connected to a second servomotor (90). The other end of the thread bar (88) is rotatably held by a bearing provided in an upright column supported on an end of a base plate extending from the base of the stand (86). On the thread bar (88), a ball screw link (92) is mounted. As shown in FIG. 6, the plate (89) is mounted on the bottom portion of the frame (81) of the endless belt device (68) and horizontally extends from the side wall of the stand (86). A pair of rails (94) is provided on the bottom portion of the frame (81) of the endless belt device. A pair of joint arms (96) vertically extends from the plate (89) toward the rails (94) and engages them.

When the second servomotor (90) axially rotates the thread bar (88) in one or the other direction, the link (92) mounted on the thread bar (88) advances or retracts in the direction shown by the arrow c in FIGS. 4 and 6. Therefore, the frame (81) of the endless belt device (68) also moves along the thread bar (88) and the pair of rails (94). The second servomotor (90) is also operatively connected to the control unit (83). As will be discussed below regarding the operation of the apparatus, the control unit (83) controls the servomotor (90) so that the frame (81) of the endless belt device (68) intermittently moves back and forth in a transverse direction. Adjacent the ball screw link (92) a second proximity switch (98) is provided. The second proximity switch (98) detects the position of the frame (81) of the endless belt device, and sends signals to the control unit (83).

Further, adjacent the upstream end roller (78) and above the upper flight of the endless belt device (68), a second spray means (100) is provided. Its spray port faces the tray (72) that is transferred by the belt. The spray means (100) sprays alcohol so that the surface of the tray (72) cannot adhere to the outer material of the spheroidal body (32).

The operation of the apparatus (1) will now be explained.

Figure 7:
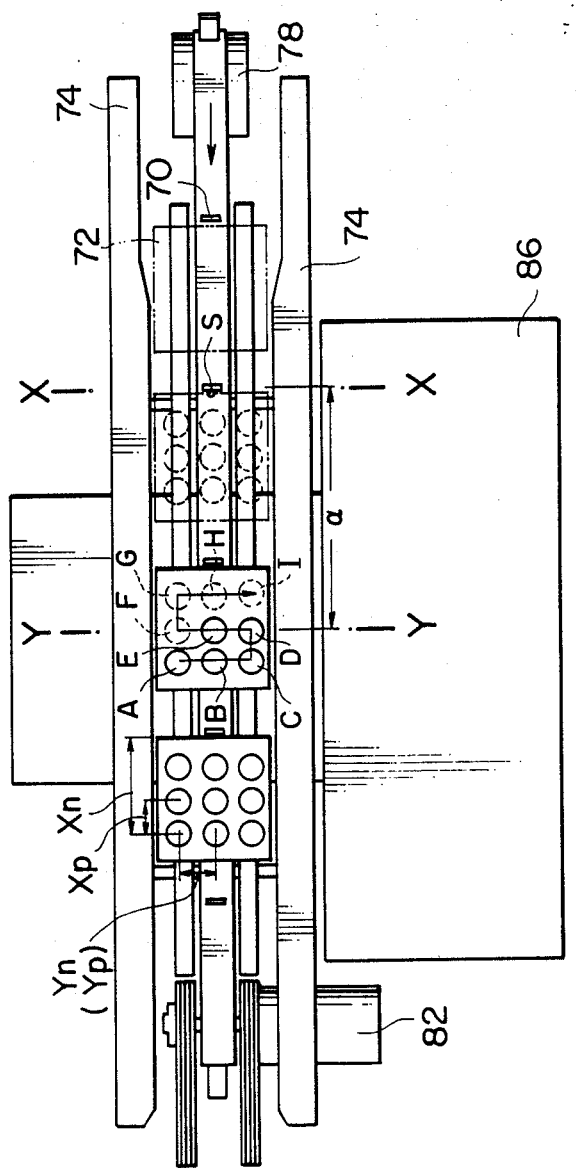
FIG. 7 shows the positions of the trays and the positions of the spheroidal bodies on each tray on the belt of the endless belt device of the arraying device of FIG. 3.

First, as shown in FIG. 7, each tray is placed on the belt so that the center part of the trailing side of the tray (72) is aligned with a hook (70). These trays (72) are manually placed by a conventional positioning machine.

As discussed above, the first proximity switch (84) sends a signal to the control unit (83) each time a hook (70) on the belt of the endless belt device passes by the switch. Please note that the belt of the endless belt device is designed so that a hook on the upper flight of the endless belt is positioned at a detecting position X—X in FIG. 7, whenever a hook on the lower flight of the belt passes by the first proximity switch (84). In this embodiment, this detecting position X—X is spaced apart from the arraying position Y—Y, which is directly beneath the center of the opening (30) of the cutter assembly, at a distance $a$ as shown in FIG. 7.

As will be discussed below, the control unit (83) stores a horizontal distance Xn, which extends from the initial position A to the nearest point on a transverse plane passing through the front surface of the hook, and a vertical distance Yn, which extends from the center S of the hook to the nearest point on a lengthwise plane passing through the center of the initial position A. Further, the control unit (83) stores a pitch Xp between the centers of any adjacent pair of positions aligned in the direction of movement of the endless belt device, and a pitch Yp between the centers of any adjacent pair of positions aligned in the direction perpendicular to the direction of movement of the endless belt device.

When the operation of the apparatus (1) begins, the first servomotor (82) drives the belt of the endless belt device, and thus the tray (72) begins to be transferred. When the first proximity switch (84) detects a hook and sends an initial signal to the control unit (83), the control unit (83) controls the first servomotor (82) so that the belt of the endless belt device forwardly moves over the additional distance $a-Xn$. At the same time, the control unit (83) activates the second servomotor (90) so that the frame (81) of the endless belt device is moved in a transverse direction toward the stand (86) over the distance Yn. Please note that the second proximity switch (98) is provided to make sure that the frame (81) of the endless belt device (68) is moved over the distance Yn so that the initial position A comes directly beneath the opening of the cutter device. Then the second proximity switch (98) sends a signal to the control unit (83).

In response to the signal from the proximity switch (98), the control unit (83) activates the supply means (8) and the cutter assembly (10). Therefore, the cutter members begin to move to open and close its center opening (30), and the cutter assembly begins to be raised and lowered based on the supply of the cylindrical body (24) from the supply means (8).

When the opening (30) is closed, the means for slidably moving cutter members sends a signal to the control unit (83). Then the control unit (83) sends signals to the first and second servomotors (82 and 90) so that the second position B for the second spheroidal body comes directly beneath the opening of the cutter assembly. Regarding the trays shown in FIG. 7, for the second position B, the first servomotor (82) is not activated, and the second servomotor (90) is activated to move the frame (81) of the endless belt device away from the stand (86) over the pitch Yp (in this case, Yn=Yp). This step is repeated for the third position C. To move the tray to the fourth position D, the control unit (83) activates the first servomotor (82) to forwardly move the belt of the endless belt device (68) over the pitch Xp, but does not activate the second servomotor (90). To move the tray to the fifth and sixth positions E and F, only the second servomotor (90) is activated to move the frame (81) of the endless belt device in a transverse direction toward the stand (86) over the pitch Yp. To move the tray to the seventh position G, only the first servomotor (82) is activated to forwardly move the belt of the endless belt device over the pitch Xp. To move the tray to the eighth and ninth positions H and I, only the second servomotor (90) is activated to move the frame (81) of the endless belt device in a transverse direction away from the stand (86) over the pitch Yp.

When all spheroidal bodies are placed on the tray, an ending signal is sent to the control unit (83). Then the control unit (83) sends a signal to the first servomotor (82) so that the belt is driven forwardly until the first proximity switch (84) detects the next hook and sends the initial signal. At that time, the control unit (83) controls the second servomotor (90) so that the frame (81) of the endless belt device is moved in a transverse direction toward the stand (86) over the distance Yn. Receiving the initial signal, the control unit (83) sends signals to the first and second servomotors (82 and 90) so that the initial position A of the subsequent tray comes directly beneath the opening (30) of the cutter assembly.

The above sequence is then repeated. When the tray arrives at the downstream end of the endless belt device (68), it is picked up by an operator for the wrapping and packaging steps. Further, where the tray is made of a heatproof material, it is transferred into an oven, and the spheroidal bodies on it are baked.

Figure 8:
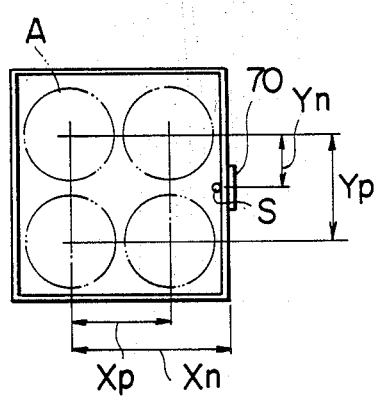
FIGS. 8, 9, and 10 shows trays of various shapes and dimensions, and the positions of the spheroidal bodies.
Figure 9:
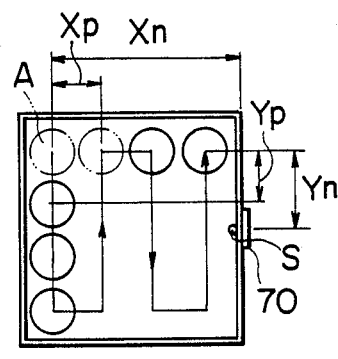
Figure 10:
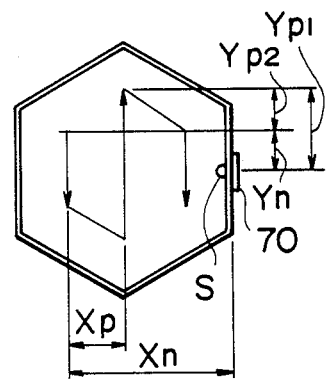

Similar sequences for trays of different sizes and shapes, such as those shown in FIGS. 8, 9 and 10, can be stored in the control unit (83). For each position of the sequence, the angles of rotation for the first servomotor (82), which angles correspond to the distance Xn and pitch Xp, and the angles of rotation for the second servomotor (90), which angles correspond to the distance Yn and pitch Yp, are stored in the control unit (83). Further, for each position the direction of the rotation of the second servomotor (90), which direction corresponds to the advancing and retracting movement of the frame (81) of the endless belt device, is also stored in the control unit (83). Preferably, once these sequences are programmed, an operator can select a desired sequence for a tray from the programmed sequences by pushing the selection buttons on the control panel of the control unit (83).

In this embodiment, all of these movements of the frame and the belt of the endless belt device are completed during each opening and closing cycle of the cutter assembly (10). Regarding the trays shown in FIG. 7, the operator can program the control unit (83) so that when all spheroidal bodies are arrayed on the first tray, the first spheroidal body for the second tray may be placed on position C. In this manner, the step to move the frame (81) of the endless belt device extending in the transverse direction toward the stand (86) in response to the ending signal can be dispensed with in the steps discussed above.

EFFECT OF THE INVENTION

As was discussed in reference to the preferred embodiment, according to this invention spherical bodies are automatically shaped and arrayed on a tray without any interruption.

Further, since the sperical bodies are automatically shaped and arrayed on a tray, there is no possibility that any part of the operator can touch the spherical bodies. Therefore, the spheroidal bodies are completely prevented from being infected.

Additionally, since these steps are performed in one apparatus, less plant space is used and more economical plant operation is achieved.

We claim:

1. An apparatus for shaping and arraying spheroidal bodies of food materials, comprising:
    (a) a device for shaping spheroidal bodies, having supply means for continuously supplying a cylindrical body composed of an outer layer of a plastic material and a central filling longitudinally in a downstream direction, a cutter assembly disposed downstream of said supply means having at least three circumferentially disposed cutter members arranged in sliding contact with each other so as to form a central opening which is openable for shaping the received part of the cylindrical body into a shaped spheroidal body and severing it from the remainder of said cylindrical body, and means for slidably moving said cutter members inwardly and outwardly of said central opening relative to each other in a direction transverse to the downstream direction of said cylindrical body so as to open and close said central opening of said cutter assembly to form each such shaped spheroidal body,
    (b) an endless belt device disposed beneath said shaping device for transferring trays for said spheroidal bodies, and
    (c) a first means for driving the belt of said endless belt device forwardly and intermittently, and a second means for moving said endless belt intermittently in a transverse direction, and said first and second means being operated synchronously with the operation of said member moving means.

2. The apparatus of claim 1, further comprising a plurality of indicator means provided on the belt of said endless belt device and spaced apart from each other at a preselected distance, for positioning said trays, and a control unit for storing an initial position of the belt of said endless belt device relative to said indicator means, and sending signals to said first and second means to move said endless belt device so that said initial position is located directly beneath said opening of said shaping device, said control unit storing each subsequent position, and sending signals to said first and second means to move said endless belt device so that each said subsequent position of the belt is located directly beneath said opening of said shaping device.

3. The apparatus of claim 2, further comprising a sensor means for detecting the passing of each of said indicator means at a predetermined position in the longitudinal direction of the belt of said endless belt means.

4. The apparatus of claim 3, wherein said adjusting means comprises an air cylinder means having a rod connected to a roller, the upstream or downstream end of said endless belt device being wound around said roller.

5. The apparatus of claim 1, further comprising means for lowering and raising said assembly synchronously with the operations of said continuous supply means and said member moving means.

6. The apparatus of claim 1, further comprising means for adjusting the length between the upstream end and the downstream end of said endless belt device.

7. The apparatus of claim 1, further comprising means for spraying material which prevents the surface of said tray from adhering to said spheroidal bodies, said spray means being located adjacent said endless belt conveyor, and upstream of said shaping device.

8. The apparatus of claim 7, wherein said material sprayed by said spray means is alcohol.

9. The apparatus of claim 1, wherein said tray is made of a heatproof material.

10. The apparatus of claim 1, wherein said cutter members each are formed with at least two sliding surfaces that are planer and parallel to the downstream direction, and along which the adjacent sliding surfaces of the adjacent cutter members are slidable, said two sliding surfaces of said cutter member having a predetermined width and being arranged to converge inwardly toward said central opening to a tapered portion having a progressively decreasing width that is less than the width of said sliding surfaces, whereby as said cutter members are moved inwardly said central opening is closed by the inwardly moving tapered portions of said cutter members forming a progressively decreasing contact area with the plastic outer layer of said cylindrical body so as to smoothly close the plastic outer layer over the inner filling of the resulting shaped body.

* * * * *